United States Patent
Zhang et al.

(10) Patent No.: US 11,327,001 B2
(45) Date of Patent: May 10, 2022

(54) PARTICLE OR POLLEN SENSOR AND SENSING METHOD

(71) Applicant: KONINKLIJKE PHILIPS N.V., Eindhoven (NL)

(72) Inventors: Peng Zhang, Shanghai (CN); Shuang Chen, Shanghai (CN); Qiushi Zhang, Shanghai (CN)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 245 days.

(21) Appl. No.: 16/652,715

(22) PCT Filed: Oct. 8, 2018

(86) PCT No.: PCT/EP2018/077236
§ 371 (c)(1),
(2) Date: Apr. 1, 2020

(87) PCT Pub. No.: WO2019/072722
PCT Pub. Date: Apr. 18, 2019

(65) Prior Publication Data
US 2020/0232899 A1 Jul. 23, 2020

(30) Foreign Application Priority Data

Oct. 9, 2017 (WO) ............... PCT/CN2017/105407
Nov. 2, 2017 (EP) .............................. EP17199742.2

(51) Int. Cl.
*G01N 15/10* (2006.01)
*G01N 15/02* (2006.01)

(52) U.S. Cl.
CPC ............. *G01N 15/10* (2013.01); *G01N 15/02* (2013.01)

(58) Field of Classification Search
CPC ........ G01N 15/10; G01N 15/02; G01N 15/00; G01N 15/06; G01N 15/0606
See application file for complete search history.

(56) References Cited

U.S. PATENT DOCUMENTS

| | | | |
|---|---|---|---|
| 6,055,052 A | 4/2000 | Lilienfeld | |
| 2002/0192653 A1* | 12/2002 | Stetter | G01N 27/226 435/6.11 |
| 2006/0021454 A1* | 2/2006 | Rasmussen | G01G 23/48 73/865 |
| 2008/0169921 A1 | 7/2008 | Peeters | |
| 2010/0116021 A1* | 5/2010 | O'Brien | G01N 21/3518 73/23.37 |

(Continued)

OTHER PUBLICATIONS

International Search Report and Written Opinion dated Jan. 3, 2019 for International Application No. PCT/EP2018/077236 Filed Oct. 8, 2018.

(Continued)

*Primary Examiner* — David Z Huang

(57) ABSTRACT

A particle or pollen sensor comprises an array of relative humidity sensors. A change in relative humidity is representative of a particle or pollen in contact with one or more of the sensors. A size and/or shape of a particle or pollen in contact with one or more of the sensors is optionally also determined based on the number and/or configuration of sensors. From this information, a particle or pollen type is determined.

15 Claims, 5 Drawing Sheets

(56) References Cited

U.S. PATENT DOCUMENTS

Figure 1:
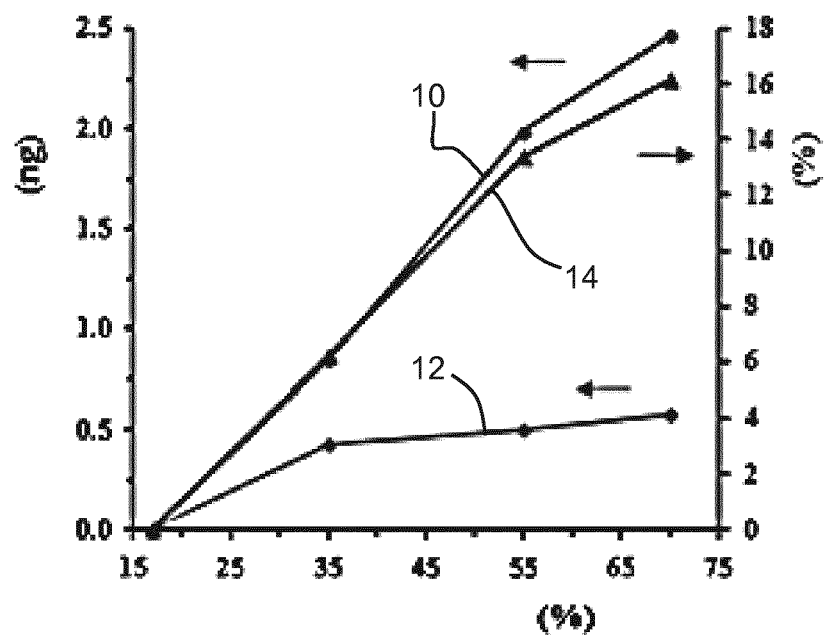

2011/0101997 A1  5/2011  Gulbranson
2016/0349168 A1  12/2016  Takasu

OTHER PUBLICATIONS

Pope, "Pollen grains are efficient cloud condensation nuclei", Environmental Research Letters, vol. 5, No. 4, Oct. 21, 2010.
Diehl, et al.: "The ice nucleating ability of pollen Part I: Laboratory studies in deposition and condensation freezing modes", Atmospheric Research 58 (2001) 75-87.
Lin, et al: "Effect of water absorption on pollen adhesion", Journal of Colloid and Interface Science 442 (2015) 133-139.
Griffiths, et al: "Hygroscopic growth and cloud activation of pollen: a laboratory and modelling study", Atmos Sci. Let. 13:289-295 (2012).

* cited by examiner

| 11 | 12 | 13 | 14 | 15 | 16 |
|----|----|----|----|----|----|
| 21 | 22 | 23 | 24 | 25 | 26 |
| 31 | 32 | 33 | 34 | 35 | 36 |
| 41 | 42 | 43 | 44 | 45 | 46 |
| 51 | 52 | 53 | 54 | 55 | 56 |
| 61 | 62 | 63 | 64 | 65 | 66 |

PARTICLE OR POLLEN SENSOR AND SENSING METHOD

CROSS REFERENCE TO RELATED APPLICATIONS

This application is the U.S. National Phase application under 35 U.S.C. § 371 of International Application No. PCT/EP2018/077236 filed Oct. 8, 2018, published as WO 2019/072722 on Apr. 18, 2019, which claims the benefit of European Patent Application Number 17199742.2 filed Nov. 2, 2017 and Patent Application Number PCT/CN2017/105407 filed Oct. 9, 2017. These applications are hereby incorporated by reference herein.

FIELD OF THE INVENTION

This invention relates to a method and apparatus for sensing and identifying particles or pollen.

BACKGROUND OF THE INVENTION

It is well known that it is desirable to monitor pollution levels, such as particulate pollutants including pollen. Various sensing devices are known, which for example provide a particle concentration level for particles below a certain size, over a certain size, or within a size range. Optical particle sensing approaches are for example known based on optical scattering.

Pollen is an important allergen that may have a serious impact on people's well-being. In addition, they are asthma triggers. To prevent or minimize human exposure, it is important to detect pollen to which humans may be exposed. The information obtained can be used to prompt other actions, for example to vacuum clean the enclosure in which the sensitive person resides or to clean surfaces in such an enclosure. This may be performed automatically, or an alert may be provided to a user to perform the cleaning action manually.

One way to distinguish between different types of particle such as pollen particles is to determine the particle size or particle size distribution. However, some pollen types may have similar sizes and size distributions to other particles. Furthermore, sensors for accurately determining size distribution information are expensive and generally only used in professional applications.

Some known pollen sensors, again based on optical detectors, are further configured to detect the polarization signatures of the scattered light from pollen. Such sensors can for example distinguish between different types of pollen and other dust by comparing the amount of scattered light and degree of polarization.

However, these known optical based sensors generally do not take into account a number factors which introduce inaccuracies. For example, light signals from the pollen are affected by the surface characteristics of the pollen, such as water absorbed on the pollen surface. The size of pollen also changes with humidity due to hygroscopicity.

There remains a need for a way to detect pollen or other particle types accurately but with a low cost sensing solution.

US2002192653A1 discloses a sensor for imaging chemical or biological samples contained in fluids. The system used impedance based techniques to detect chemical or biological particles.

F D POPE: "Pollen grains are efficient cloud condensation nuclei", ENVIRONMENTAL RESEARCH LETTERS, vol. 5, no. 4, 21 Oct. 2010 (2010 Oct. 21) discloses that that pollen exhibits bulk uptake of water under sub-saturated conditions.

US2011101997A1 discloses monitoring the moisture content of particles using a capacitance sensor.

SUMMARY OF THE INVENTION

The invention is defined by the claims.

According to examples in accordance with an aspect of the invention, there is provided a particle or pollen sensor comprising:

an array of relative humidity sensors; and
a processor for processing the signals from the array of humidity sensors,
wherein the processor is adapted to:
detect a change in relative humidity representative of a particle or pollen in contact with one or more of the sensors of the array of relative humidity sensors, and thereby determine a relative humidity change associated with presence of the particle or pollen; and
identify a type of a particle or pollen based on the change in relative humidity.

The invention provides a particle or pollen sensor in which different particle types such as pollen are detected based on their difference in hygroscopicity, which in turn depends on the surface structure and dry mass. The invention is based on distinguishing the hygroscopicity or water content of pollen or other particles by making use of relative humidity sensors, and this enables a low cost and small pollen sensor to be formed. For the detection of pollen, the sensor may be used to identify the presence of any pollen based on the general property of taking up water, or it may additionally be used to distinguish between pollen types for example by performing a size analysis as well.

It may also be possible to use a relative humidity measurement alone to distinguish between pollen types based on the different water absorbance of different pollen types. Thus for a known environmental relative humidity level, the different response of different pollen types at that known relative humidity level can be used to identify pollen types. This requires measurement of the ambient relative humidity level as well as a calibration of the system to different ambient relative humidity levels.

The processor may be further adapted to:
detect a size and/or shape of a particle or pollen in contact with one or more of the sensors based on the number and/or configuration of sensors; and
identify a particle or pollen type additionally based on the size and/or shape.

The same sensor array may in this way be used to detect particle size information, if the individual sensor elements may be formed with a scale smaller than individual particles or pollen grains. This is possible for example with a MEMS sensor array.

Individual particles are preferably detected, and this means that accurate particle size distribution information may be obtained. This enables different pollen types to be determined.

The sensor preferably comprises a fan for drawing air to the array of relative humidity sensors. This is used both to supply air for sensing and also to remove previously collected particles or pollen to provide a reset function.

The sensor preferably further comprises a vibrator for dislodging particles or pollen from the array of relative humidity sensors. The combined effect of vibration and an air flow provides an effective cleaning mechanism.

The vibrator for example comprises a piezoelectric vibrator attached to the array of relative humidity sensors. It may for example be coupled to a substrate of the sensor array. The array of relative humidity sensors for example comprises an array of polymer elements and an array of readout conductors, and a detection circuit for monitoring impedance values associated with each polymer element. The impedance varies with the take up of moisture transferred from the particle or pollen, and this enables measurement of the water take up of the particle or pollen.

Each relative humidity sensor for example has an area of less than 10 μm². This enables a single particle or pollen grain to cover or contact multiple humidity sensors.

The array of relative humidity sensors may be formed over a flexible substrate. This assists in the removal of particles or pollen from the sensors, for example by vibration.

The sensor may further comprise a database storing relationships between relative humidity information and/or size and shape information and particle or pollen types. This enables the conversion from relative humidity information and size and shape information to particle or pollen type. This database may be part of the particle or pollen sensor, but it may instead be an external information source which is accessed for the interpretation of the collected data.

The processor may further be adapted to take account of location information and/or time of year information for identifying pollen types. In a certain location and at a certain time point, some pollen types are much more likely to be present than others. This statistical information can be taken into account for reaching a conclusion about pollen type.

The invention also provides a particle or pollen sensing method comprising:

detecting a change in relative humidity representative of a particle or pollen in contact with one or more sensors of an array of relative humidity sensors, and thereby determining a change in relative humidity associated with presence of the particle or pollen; and identifying a particle or pollen based on the change in relative humidity.

The method may further comprise detecting a size and/or shape of a particle or pollen in contact with one or more of the sensors based on the number and/or configuration of sensors, and this information may also be used to identify the particle or pollen type.

The method may further comprise drawing air to the array of relative humidity sensors, and optionally dislodging particles or pollen from the array of relative humidity sensors by vibration.

Relative humidity may be detected by monitoring impedance values associated with each sensor.

Location information and/or time of year information may also be taken into account for identifying the particle or pollen type.

The invention may be implemented at least in part in computer software.

BRIEF DESCRIPTION OF THE DRAWINGS

Examples of the invention will now be described in detail with reference to the accompanying drawings, in which:

FIG. 1 shows the measured water uptake onto pollen for different pollen types;

FIG. 2 shows a relative humidity (RH) sensor array;

FIG. 3 shows the sensor array of FIG. 2 in cross section;

FIG. 4 shows the response of four different sensor elements over time, and shows the relative humidity reading over time in response to the arrival of different pollen types;

FIG. 5 shows the response of three different sensor elements over time, and shows the relative humidity reading over time in response to the arrival of different pollen types;

FIG. 6 shows the array of sensors with the individual sensors numbered to explain size and shape detection; and FIG. 7 shows a particle or pollen sensing method.

DETAILED DESCRIPTION OF THE EMBODIMENTS

The invention provides a particle or pollen sensor which comprises an array of relative humidity sensors. A change in relative humidity is representative of a particle or pollen in contact with one or more of the sensors. Thus, detecting a change of relative humidity in relative humidity measurement wherein the change in relative humidity is representative of a particle or pollen. A size and/or shape of a particle or pollen in contact with one or more of the sensors is optionally also determined based on the number and/or configuration of sensors. From this information, a particle or pollen is determined and optionally also a particle type or pollen type.

The invention is based on the recognition that pollen and some other particle types may be detected based on different water uptake characteristics.

The invention will be described with reference to a pollen sensor. However, as will be clear from the description below, the size determination aspect may be used to identify other particle types. Furthermore, some other particle types also show different water take up characteristics and may thus also be distinguished.

In general, biological particles such as pollen are relatively large, with a maximum linear dimension (e.g. diameter) in the range 10 μm to 100 μm. When the relative humidity (in the atmosphere from which the biological particle has been sampled) is high, a high relative humidity sensor reading is obtained from contact with the particle, and when the relative humidity is low, a low relative humidity sensor reading is obtained from contact with the particle. In addition, the size of biological particles also tends to increase with ambient relative humidity and hence its water content.

Inorganic particles such as salts have a relatively small size, for example in the range 2.5 μm to 10 μm. They may be dissolved when there is a high relative humidity, and demonstrate efflorescence when there is low relative humidity.

Organic particles such as tar also may have a relatively small size, for example in the range 2.5 μm to 10 μm. However, the size of the organic particles as well as the relative humidity reading of the humidity sensor from contact with the particle does not depend on the prevailing ambient relative humidity level.

These combinations of effects may enable biological particles such as pollen, inorganic particles and organic particles to be distinguished to a certain degree based on hygroscopicity and particle size.

It has been shown that pollen has a water uptake which is dependent on relative humidity, and pollen may be able to take up significant amounts of water from a humid environment not only at the surface but also into the interior by capillary effects. The amount of water absorbed by pollen is affected by the surface structures and their dry mass.

FIG. 1 shows the measured water uptake onto pollen as reported in Environ. Res. Lett. 5 (2010) 044015. Plots 10 and 12 show the water amount in ng for two pollen types (sunflower PK+ is plot 10 and sunflower PK− is plot 12) using the left y-axis. Plot 14 shows the percentage water uptake for the PK+ sunflower pollen using the right y-axis.

The x-axis plot the relative humidity in %.

Figure 2:
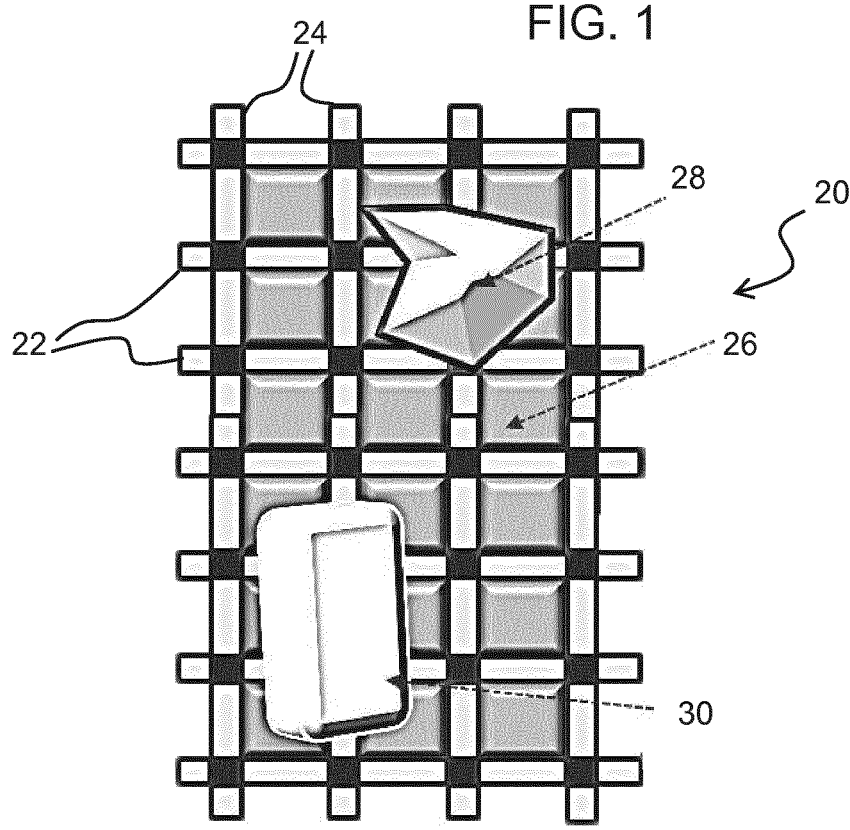

FIG. 2 shows a relative humidity (RH) sensor array 20 comprising an array of hundreds or even thousands of RH sensors. The sensor array 20 comprise a grid of read out electrodes arranged in row 22 and columns 24, with one sensor 26 associated with each row and column intersection.

The array may be fabricated with mass production by utilizing MEMS techniques. Each individual RH sensor 26 is for example of a small size such as 2 μm by 2 μm. When particles fall on the sensor array, different pollen types may be identified based on the change of the RH signal.

In one example, the RH sensor makes use of a polymer, such as polyimide, whose permittivity and impedance changes when absorbing the moisture from the air. The two electrodes associated with each sensor (i.e. one row and one column), making contact with the two ends of a polymer strip, are used to measure the changes of impedance (such as capacitance or resistance) of the polymer.

In another example, a sensor design may make use of sensing the resistance of a metal oxide sensing film. Hydrogen atoms in the polymer react with chemisorbed and/or lattice oxygen on the surface of the metal oxide film thus reducing the resistance.

The read out thus involves a measurement of the impedance values of the array of sensors. This may be carried out row by row or column by column, for example by delivering a signal to a row conductor and measuring a response on each column conductor at the same time.

One example is to apply a voltage to the sensor, and the impedance may be measured for example using a Wheatstone Bridge circuit (or indeed any other suitable circuit design). For a sensor array, a scanned readout may be employed, for example driving row 1 first, and reading out the columns, then driving row 2, and reading out the columns, and so on.

When pollen contacts the RH sensor surface, there will be a water transport between the pollen and the polymer depending on their difference in hygroscopicity or surface energy. The signal of the RH sensor changes when it is wetted by the pollen or dried by the pollen. If the pollen has a stronger hygroscopicity, it takes up the water from the RH sensor surface (polymer) and thus reduces RH readings at the sensor. Alternatively, if the pollen has a high water content level (for example, the pollen has been stored in a high RH environment for some time), when the pollen contacts the RH sensor surface, the sensor absorbs water from the pollen and its RH reading increases.

The sensor array may also be used to obtain information about the number of particles and even the size and shape by counting how many RH sensors have altered output signals. FIG. 2 shows two different particle types, for example a pollen grain 28 and a dust particle 30.

Figure 3:
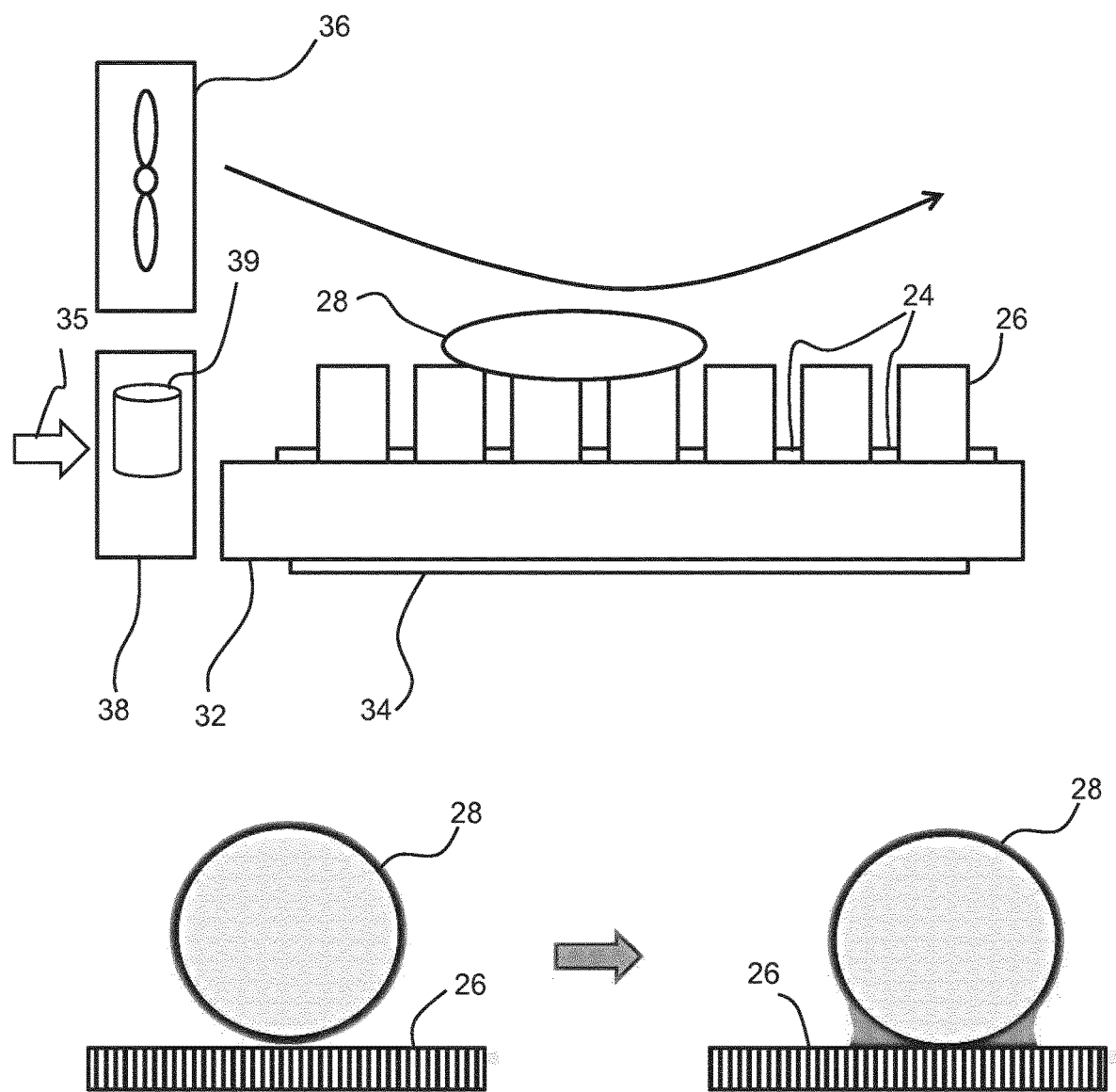

The top part of FIG. 3 shows the sensor in cross section. The sensors 26 are formed on top of a soft substrate 32 and a piezoelectric ceramic element 34 is attached to the back of the substrate 32. After detection, the piezoelectric ceramic element is powered on to vibrate the soft substrate and to dislodge particles from the substrate. In addition, a fan 36 is provided and is turned on to remove the dislodged particles and refresh the sensor. The fan serves to deliver an air sample to the sensor and also remove particles after detection.

FIG. 3 also shows a controller 38 for processing the RH sensor signals. It thus implements a detection circuit for monitoring the sensor signals, for example for measuring impedance values associated with each polymer or metal oxide (or other) sensing element. The controller includes or has access to a database 39 for interpreting the sensor signals to identify the presence of pollen or another type of particle, and optionally even a pollen type. The controller 38 has an input 35 for receiving external information such as the season or weather information, and this information can be used to assist in determining the type of pollen that has been detected.

Pollen generally is spherical or ellipsoidal, so it could be considered that there is only one contact point with the sensor array. However, as shown in the bottom part of FIG. 3, the contact point forms an area. When the pollen 28 contacts the sensor surface, due to the capillary effect, water will fill the narrow gap between the pollen and the surface with a large capillary force. Water thus also tends to form in this area giving an effective contact area equivalent in size to the pollen.

Furthermore, if the sensing surface has some flexibility, the contact area will be larger.

The shape sensing enables generally regular pollen to be distinguished from other irregular particle types.

Figure 4:
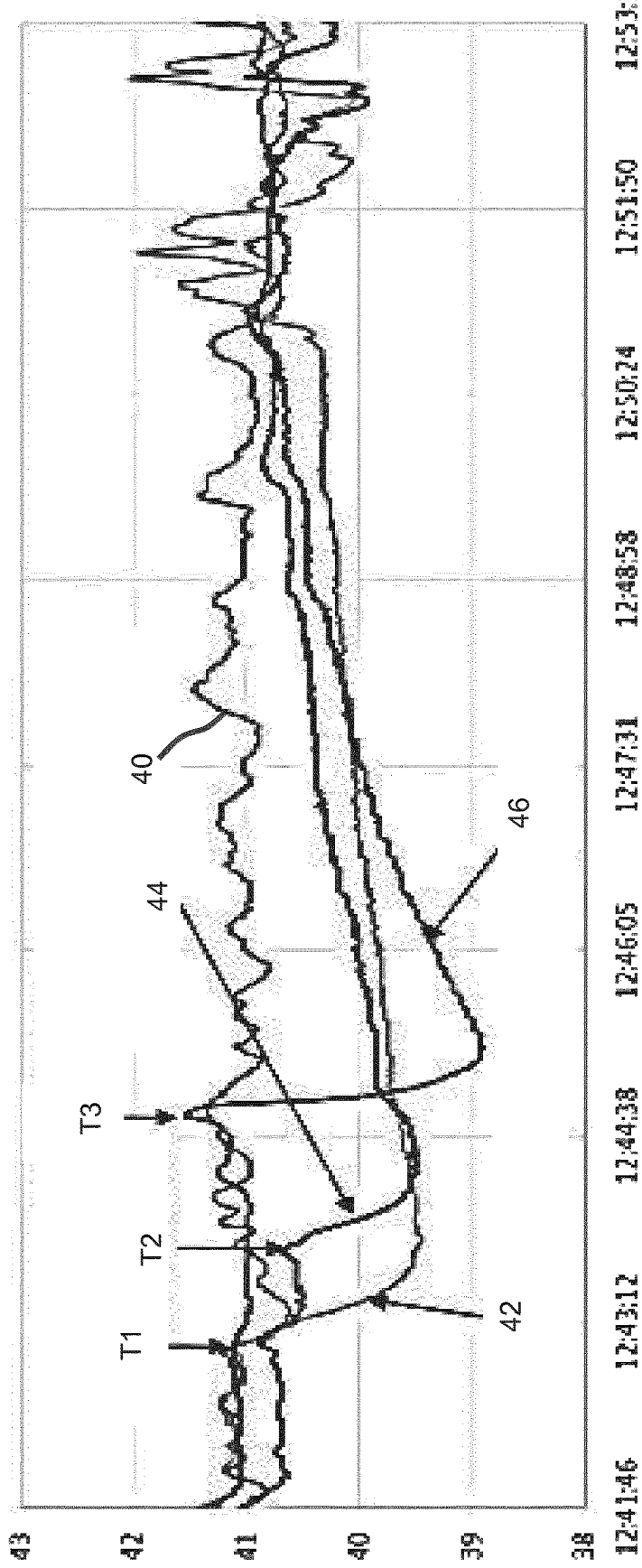

FIG. 4 shows the response of four different sensor elements over time, and shows the relative humidity reading over time.

Plot 40 is for a reference sensor element.

Plot 42 is for a sensor element which is contacted by an elm pollen grain at time T1.

Plot 44 is for a sensor element which is contacted by a pine pollen grain at time T2.

Plot 46 is for a sensor element which is contacted by a mulberry pollen grain at time T3.

In each case, a drop in relative humidity is seen, and in particular relative humidity changes of 1.139%, 0.890% and 2.064% for plots 42, 44, 46 respectively.

Figure 5:
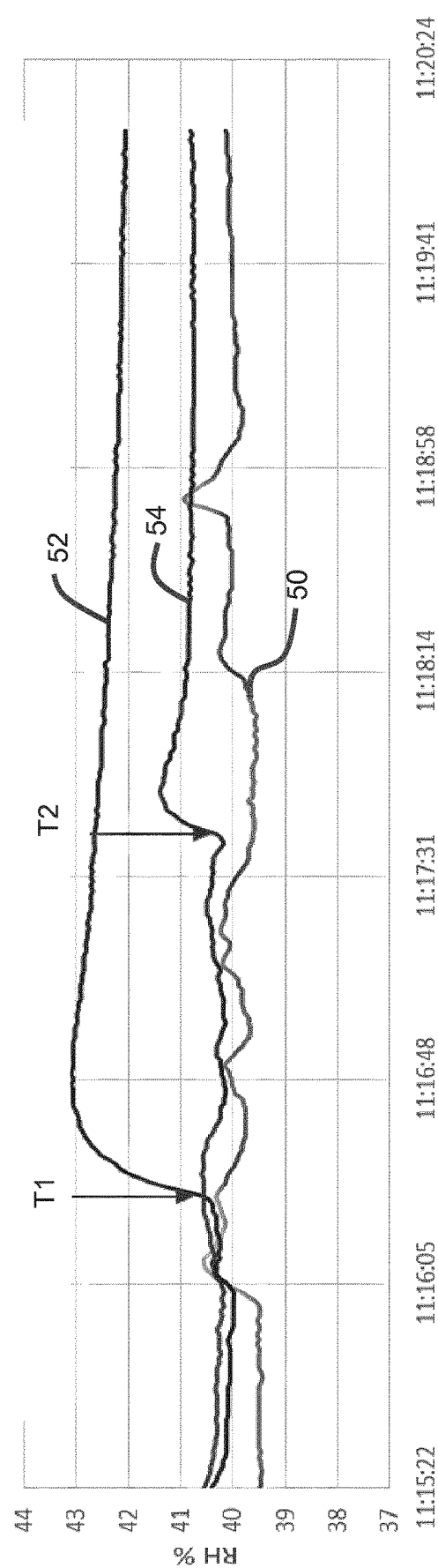

FIG. 5 shows the response of three different sensor elements over time, and shows the relative humidity reading over time.

Plot 50 is for a reference sensor element.

Plot 52 is for a sensor element which is contacted by a pine pollen grain at time T1.

Plot 54 is for a sensor element which is contacted by a ragweed pollen grain at time T2.

In each case, a rise in relative humidity is seen because the pollen has come from a higher relative humidity environment than in FIG. 4.

The sensor may include measurement of the ambient relative humidity, and indeed a portion of the sensor array may be reserved for this measurement (by preventing particles reaching that part of the sensor). The relative humidity measurements may then be interpreted taking account of the general ambient relative humidity level so that different pollen types can be identified based on their response at that particular ambient relative humidity level. This requires calibration of the system to different ambient relative humidity levels so that the collected data can be interpreted.

Figures 6, 7:
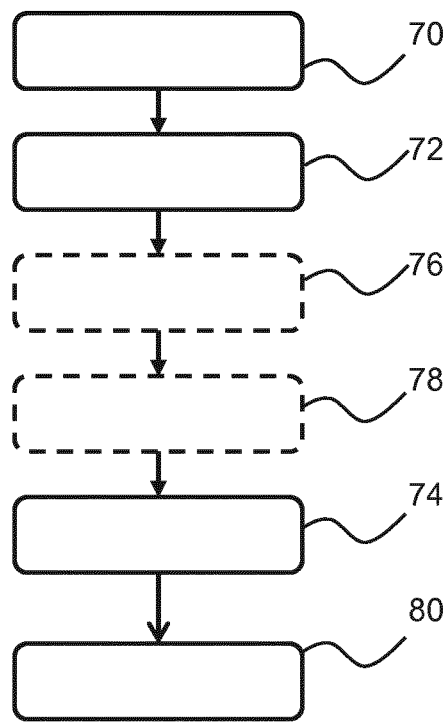

FIG. 6 shows the array of sensors with the individual sensors numbered as xy where x is the row number 1 to 6 and y is the column number 1 to 6.

If a particle sits on the sensor array over a region covering sensor elements 24, 25, 34, 35, the system will then record and analyze the signals from this group of sensors.

Three types of information can be derived.

1) the maximum and/or average RH change in respect of the group of sensors
2) pollen size information based on the number of sensors with changed RH values
3) pollen shape information based on the set of sensors, such as the square shape shown in FIG. 6.

Pollen typically has a diameter (or other linear dimension) in the range 10 μm to 100 μm. Thus as many as 20 sensors of 2 μm×2 μm may be covered by a single pollen grain even of the smallest type. Preferably, each sensor has an area of 20 $\mu m^2$ or less, for example 20 $\mu m^2$ or less so that individual pollen grains are detected. The smaller the sensor element pitch, the greater the ability to provide shape and size determination as well as ensuring that sensor signals for individual pollen grains can be determined.

FIG. 7 shows a particle or pollen sensing method.

In step 70, particles or pollen come into contact with the sensor.

In step 72 a change in relative humidity representative of a particle or pollen in contact with one or more sensors is detected.

In step 74 a particle or pollen type is determined based on the relative humidity and optionally also the size and/or shape.

The method may also include in step 76 detecting a size and/or shape of a particle or pollen in contact with one or more of the sensors based on the number and/or configuration of sensors. This information is also used in step 74 to identifying the particle or pollen type.

The method may also include in step 78 taking into account location information and/or time of year information for identifying the particle or pollen type. This information is also used in step 74 to identifying the particle or pollen type.

The location information and time of year information may be used to access a database which stores identification of pollen types which are likely to be present, for example with a probability of their presence at that location and time of year. In this way, even with pollen with similar relative humidity profiles, the sensor may be able to provide a determination of a most likely pollen type being detected.

In step 80, the method comprises dislodging particles or pollen from the array of relative humidity sensors by vibration and the action of a fan.

The conversion from recorded RH values to pollen identification makes use of an algorithm which may be locally stored at the sensor or at least partly stored and accessed remotely.

As explained above, the change in relative humidity observed when a particle makes contact with the sensor depends on the prevailing conditions. However, in general when a change in relative humidity is observed, organic particles are likely to be the cause since other particle types do not cause a change in the relative humidity sensor output. By taking account in addition of the particle size and shape, the detection accuracy may be increased and may also distinguish between different pollen types. The season and weather information as well as any other local information may also be used to provide a more intelligent conclusion about a type of pollen that has been detected.

Thus, it can be seen that the relative humidity measurement may be used to identify pollen or biological particles generally, and other information such as size, shape, and weather, location or season information may be used to enable determination of specific pollen types. However, with suitable calibration, the relative humidity measurement may itself allow, or partly allow, distinguishing between different pollen types as discussed above.

The synthesis of humidity sensing materials is well known and they may be formed as coatings with nano-scale dimensions. MEMS technology is also able to fabricate small sensing units. For example, micromachined silicon nano-needles may be formed as small as 2 μm×2 μm. For detection of even smaller areas, single quantum dots (of size around 100 nm) are also known for sensing purposes.

The sensor array may be a regular square (or rectangular) array with orthogonal rows and columns, but other topologies are possible, such as a triangular (hexagonal) topology.

As discussed above, embodiments make use of a controller 38. The controller can be implemented in numerous ways, with software and/or hardware, to perform the various functions required. A processor is one example of a controller which employs one or more microprocessors that may be programmed using software (e.g., microcode) to perform the required functions. A controller may however be implemented with or without employing a processor, and also may be implemented as a combination of dedicated hardware to perform some functions and a processor (e.g., one or more programmed microprocessors and associated circuitry) to perform other functions.

Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media such as volatile and non-volatile computer memory such as RAM, PROM, EPROM, and EEPROM. The storage media may be encoded with one or more programs that, when executed on one or more processors and/or controllers, perform the required functions. Various storage media may be fixed within a processor or controller or may be transportable, such that the one or more programs stored thereon can be loaded into a processor or controller.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A particle or pollen sensor comprising:

an array of relative humidity sensors; and a processor for processing the signals from the array of humidity sensors, wherein the processor is adapted to:

detect a change in relative humidity representative of a particle or pollen in contact with one or more sensors of the array of relative humidity sensors, and thereby determine a change in relative humidity associated with presence of the particle or pollen; and identify a type of a particle or pollen based on the change in relative humidity.

2. The particle or pollen sensor as claimed in claim 1, wherein the processor is further adapted to:
  detect a size and/or shape of a particle or pollen in contact with one or more of the sensors based on the number and/or configuration of sensors; and
  identify a particle or pollen type additionally based on the size and/or shape.

3. The particle or pollen sensor as claimed in claim 1, further comprising a fan for drawing air to the array of relative humidity sensors.

4. The particle or pollen sensor as claimed claim 1, further comprising a vibrator for dislodging particles or pollen from the array of relative humidity sensors.

5. The particle or pollen sensor as claimed in claim 4, wherein the vibrator comprises a piezoelectric vibrator attached to the array of relative humidity sensors.

6. The particle or pollen sensor as claimed in claim 1 wherein the array of relative humidity sensors comprises an array of polymer elements and an array of readout conductors, and a detection circuit for monitoring impedance values associated with each polymer element.

7. The particle or pollen sensor as claimed in claim 1, wherein each relative humidity sensor has an area of less than 10 $\mu m^2$.

8. The particle or pollen sensor as claimed in claim 1 further comprising a database storing relationships between relative humidity information and particle or pollen types.

9. The particle or pollen sensor as claimed in claim 1 wherein the processor is further adapted to take into account location information and/or time of year information for identifying the particle or pollen type.

10. A particle or pollen sensing method comprising:
  detecting a change in relative humidity representative of a particle or pollen in contact with one or more sensors of an array of relative humidity sensors, and thereby determining a change in relative humidity associated with presence of the particle or pollen; and
  identifying a type of particle or pollen based on the change in relative humidity.

11. The particle or pollen sensing method as claimed in claim 10, further comprising:
  detecting a size and/or shape of a particle or pollen in contact with one or more of the sensors based on the number and/or configuration of sensors; and
  identifying a particle or pollen type additionally based on the size and/or shape.

12. The method as claimed in claim 10, further comprising dislodging particles or pollen from the array of relative humidity sensors by vibration.

13. The method as claimed in claim 10 comprising detecting relative humidity by monitoring impedance values associated with each sensor.

14. The method as claimed in claim 10, comprising taking into account location information and/or time of year information for identifying the particle or pollen type.

15. A non-transitory computer program comprising computer program code means which is adapted, when said computer program is run on a computer, to perform the method of claim 10.

* * * * *